US008707132B2

(12) United States Patent
Nakagawa et al.

(10) Patent No.: US 8,707,132 B2

(45) Date of Patent: Apr. 22, 2014

(54) INFORMATION PROCESSING APPARATUS, INFORMATION PROCESSING METHOD, AND STORAGE MEDIUM

(75) Inventors: Akio Nakagawa, Yokohama (JP); Hisashi Ishikawa, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 264 days.

(21) Appl. No.: 13/175,556

(22) Filed: Jul. 1, 2011

(65) Prior Publication Data

US 2012/0047418 A1 Feb. 23, 2012

(30) Foreign Application Priority Data

Aug. 18, 2010 (JP) ................................ 2010-183386

(51) Int. Cl.

| | |
|---|---|
| ***G11C 29/00*** | (2006.01) |
| ***G09G 5/36*** | (2006.01) |
| ***G09G 5/00*** | (2006.01) |
| ***G06F 13/00*** | (2006.01) |
| ***H04L 12/28*** | (2006.01) |
| ***G06F 9/34*** | (2006.01) |
| ***G06F 3/00*** | (2006.01) |

(52) U.S. Cl.

USPC ........... 714/763; 714/766; 714/767; 345/553; 345/616; 345/547; 345/543; 345/538; 345/537; 345/564; 345/565; 370/403; 370/420; 711/202; 711/169; 711/200; 711/215; 711/217; 710/4

(58) Field of Classification Search

USPC .......... 714/763, 766, 767; 345/553, 616, 686, 345/547, 543, 538, 537, 564, 565; 370/403, 370/420; 711/202, 169, 200, 215, 217; 710/4

See application file for complete search history.

(56) References Cited

U.S. PATENT DOCUMENTS

| | | | | |
|---|---|---|---|---|
| 4,903,124 A | 2/1990 | Hoshi et al. | | 358/133 |
| 5,107,519 A | 4/1992 | Ishikawa | | 375/27 |
| 5,117,499 A | * | 5/1992 | Miyata | 712/26 |
| 5,337,160 A | * | 8/1994 | Jones | 358/447 |

(Continued)

FOREIGN PATENT DOCUMENTS

| | | |
|---|---|---|
| JP | 63-309456 A | 12/1988 |
| JP | 4-39929 B2 | 7/1992 |

(Continued)

OTHER PUBLICATIONS

Shu et al. Adaptive Color Error Diffusion to Improve Halftone Smoothness, Apr. 4, 2007, SPIE Digital Library, pp. 308-315.*

(Continued)

*Primary Examiner* — John J Tabone, Jr.

(74) *Attorney, Agent, or Firm* — Fitzpatrick, Cella, Harper & Scinto

(57) ABSTRACT

An information processing apparatus comprising: a reception unit adapted to receive a packet containing first data to be stored in a storage unit, a first address indicating an address of second data held in the storage unit, and a second address indicating an address at which the first data is to be written in the storage unit; an access unit adapted to read out the second data from the storage unit based on the first address, and write the first data in the storage unit based on the second address; and a transmission unit adapted to replace the first data of the packet received by the reception unit with the second data read out by the access unit, and transmit the packet.

12 Claims, 9 Drawing Sheets

(56) References Cited

U.S. PATENT DOCUMENTS

| | | | | |
|---|---|---|---|---|
| 5,375,002 | A * | 12/1994 | Kim et al. | 358/521 |
| 5,394,529 | A * | 2/1995 | Brown et al. | 712/240 |
| 5,404,553 | A * | 4/1995 | Komori et al. | 712/25 |
| 5,448,703 | A * | 9/1995 | Amini et al. | 710/110 |
| 5,481,689 | A * | 1/1996 | Stamm et al. | 711/202 |
| 5,526,502 | A * | 6/1996 | Yoshida et al. | 711/202 |
| 5,542,058 | A * | 7/1996 | Brown et al. | 713/502 |
| 5,570,432 | A * | 10/1996 | Kojima | 382/254 |
| 5,699,460 | A * | 12/1997 | Kopet et al. | 382/307 |
| 5,729,711 | A * | 3/1998 | Okamoto | 711/205 |
| 5,809,320 | A * | 9/1998 | Jain et al. | 712/34 |
| 6,088,774 | A * | 7/2000 | Gillingham | 711/167 |
| 6,108,452 | A * | 8/2000 | Ilbery | 382/252 |
| 6,231,149 | B1 * | 5/2001 | Matsumoto | 347/5 |
| 6,317,817 | B1 * | 11/2001 | Shichiku et al. | 711/202 |
| 6,928,529 | B2 * | 8/2005 | Shinomiya | 711/203 |
| 6,959,351 | B2 | 10/2005 | Gwilt et al. | 710/110 |
| 7,025,252 | B2 * | 4/2006 | Kim | 234/63 |
| 7,051,183 | B2 * | 5/2006 | Igura | 711/219 |
| 7,210,008 | B2 * | 4/2007 | Chandra et al. | 711/154 |
| 7,266,254 | B2 * | 9/2007 | Ishikawa et al. | 382/305 |
| 7,480,078 | B2 * | 1/2009 | Choi et al. | 358/3.03 |
| 7,598,933 | B2 * | 10/2009 | Kim | 345/63 |
| 7,667,708 | B2 * | 2/2010 | Kamijo et al. | 345/531 |
| 7,711,976 | B2 * | 5/2010 | Satoh et al. | 713/600 |
| 8,145,874 | B2 * | 3/2012 | Venkumahanti et al. | 711/202 |
| 8,159,720 | B2 * | 4/2012 | Fan | 358/3.06 |
| 2005/0007375 | A1 * | 1/2005 | Yi | 345/537 |
| 2005/0225806 | A1 * | 10/2005 | Damera-Venkata | 358/3.03 |
| 2007/0074014 | A1 * | 3/2007 | Musoll et al. | 712/300 |

FOREIGN PATENT DOCUMENTS

| | | | | |
|---|---|---|---|---|
| JP | H 5-274213 | | 10/1993 | |
| JP | 6-42266 | B2 | 6/1994 | |
| JP | 2003-345648 | A | 12/2003 | |
| JP | 4359490 | B2 | 11/2009 | |
| WO | WO 0065567 | A1 * | 11/2000 | G09G 3/20 |

OTHER PUBLICATIONS

Akhter et al., Multi-Core Programming Increasing Performance through Software Multi-threading, 2006, Intel Press, pp. 1-8.*

* cited by examiner

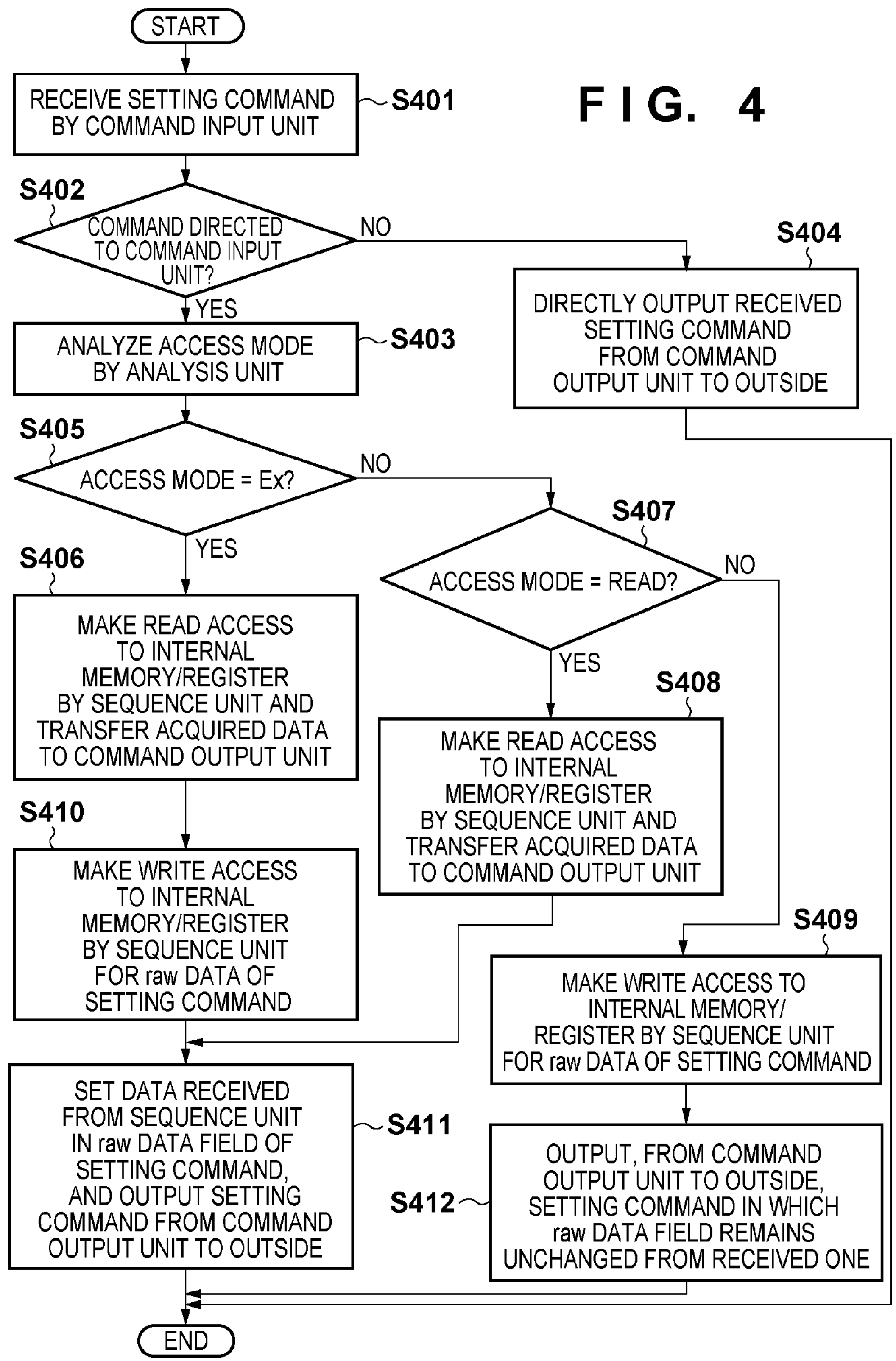
START
RECEIVE SETTING COMMAND BY COMMAND INPUT UNIT
S401
F I G. 4
S402
COMMAND DIRECTED TO COMMAND INPUT UNIT?
NO
YES
S404
DIRECTLY OUTPUT RECEIVED SETTING COMMAND FROM COMMAND OUTPUT UNIT TO OUTSIDE
ANALYZE ACCESS MODE BY ANALYSIS UNIT
S403
S405
ACCESS MODE = Ex?
NO
YES
S407
ACCESS MODE = READ?
NO
YES
S406
MAKE READ ACCESS TO INTERNAL MEMORY/REGISTER BY SEQUENCE UNIT AND TRANSFER ACQUIRED DATA TO COMMAND OUTPUT UNIT
S408
MAKE READ ACCESS TO INTERNAL MEMORY/REGISTER BY SEQUENCE UNIT AND TRANSFER ACQUIRED DATA TO COMMAND OUTPUT UNIT
S410
MAKE WRITE ACCESS TO INTERNAL MEMORY/REGISTER BY SEQUENCE UNIT FOR raw DATA OF SETTING COMMAND
S409
MAKE WRITE ACCESS TO INTERNAL MEMORY/ REGISTER BY SEQUENCE UNIT FOR raw DATA OF SETTING COMMAND
SET DATA RECEIVED FROM SEQUENCE UNIT IN raw DATA FIELD OF SETTING COMMAND, AND OUTPUT SETTING COMMAND FROM COMMAND OUTPUT UNIT TO OUTSIDE
S411
S412
OUTPUT, FROM COMMAND OUTPUT UNIT TO OUTSIDE, SETTING COMMAND IN WHICH raw DATA FIELD REMAINS UNCHANGED FROM RECEIVED ONE
END F I G. 5A
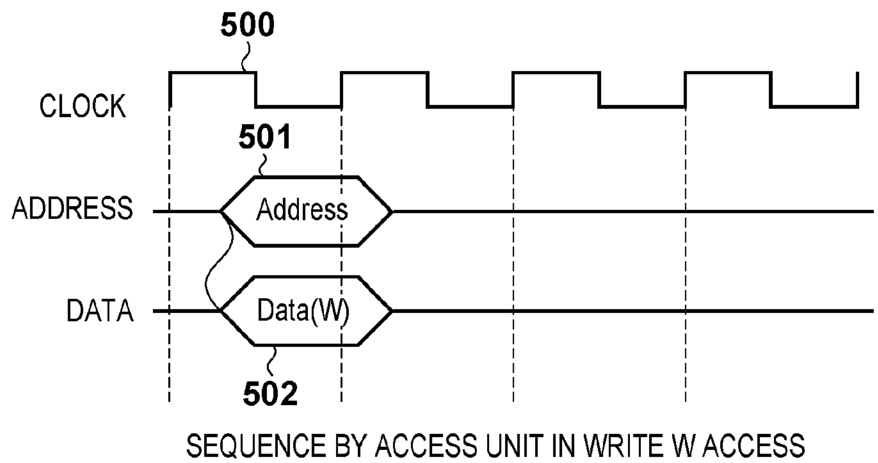
SEQUENCE BY ACCESS UNIT IN WRITE W ACCESS
F I G. 5B
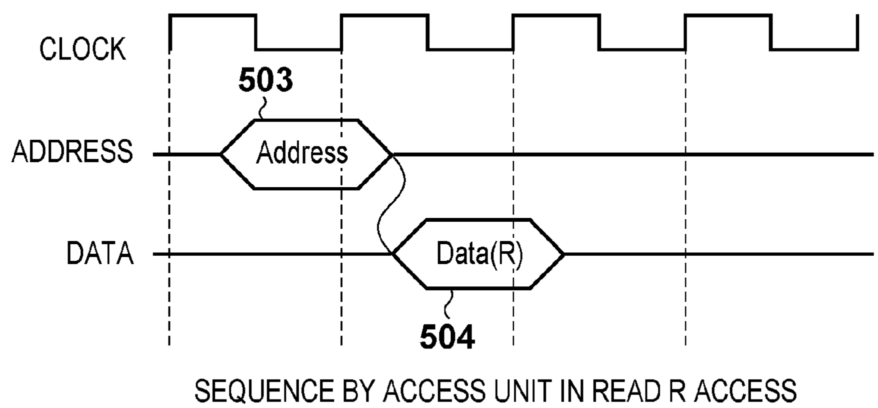
SEQUENCE BY ACCESS UNIT IN READ R ACCESS
F I G. 5C
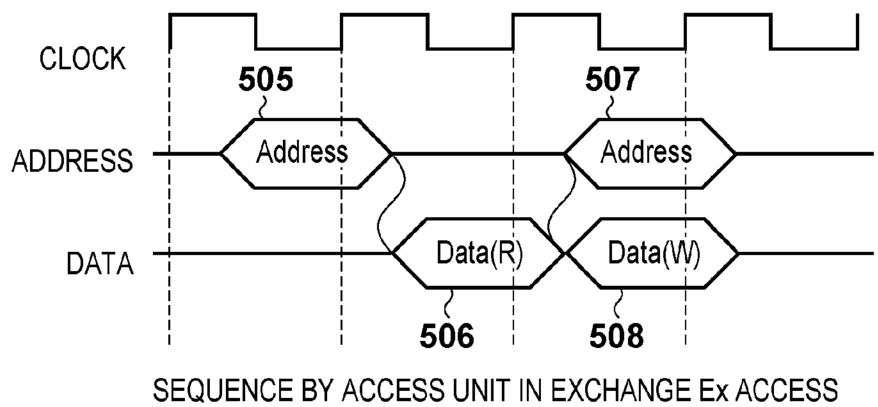
SEQUENCE BY ACCESS UNIT IN EXCHANGE Ex ACCESS

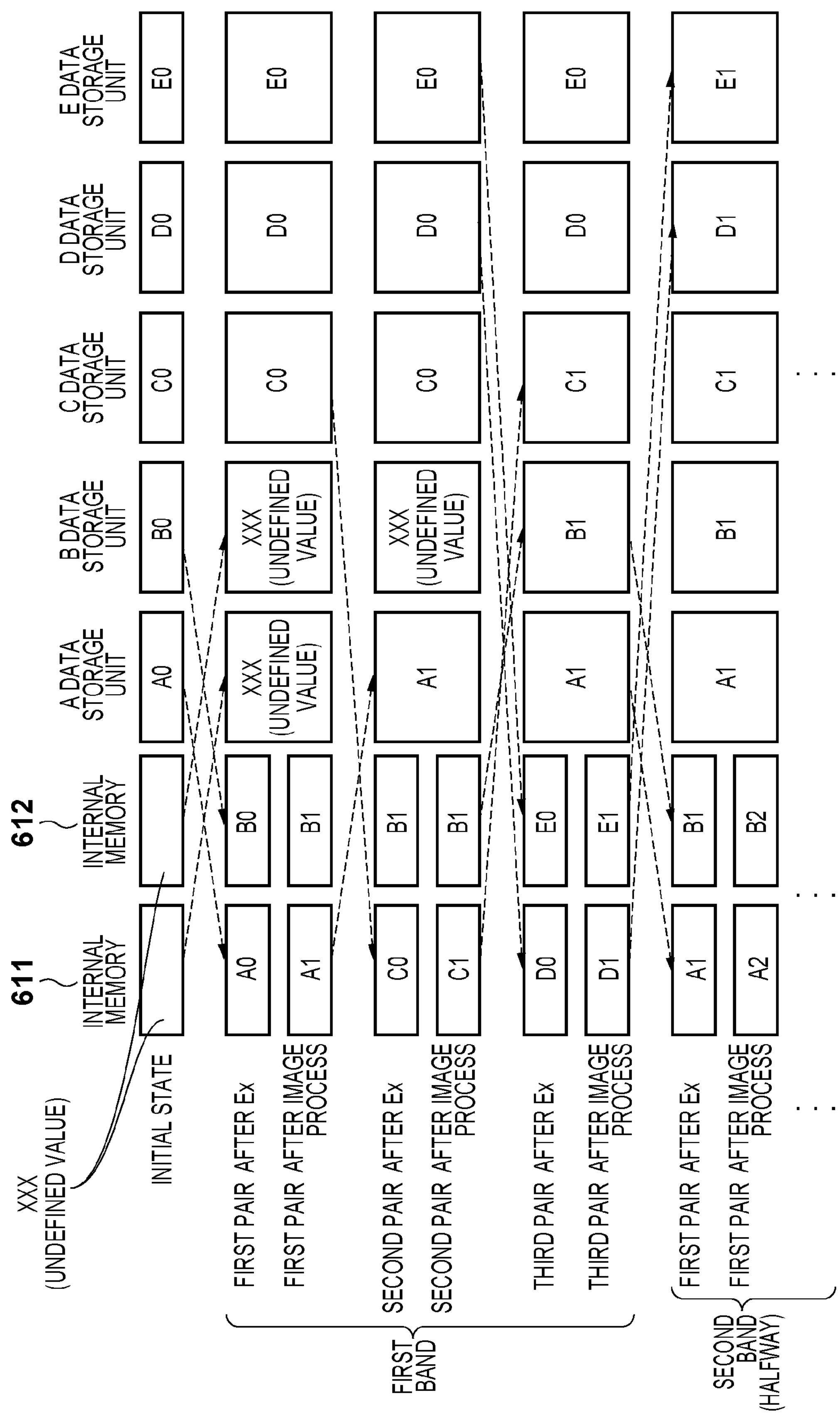
F I G. 7
XXX (UNDEFINED VALUE)
611
INTERNAL MEMORY
612
INTERNAL MEMORY
A DATA STORAGE UNIT
B DATA STORAGE UNIT
C DATA STORAGE UNIT
D DATA STORAGE UNIT
E DATA STORAGE UNIT
INITIAL STATE
A0
B0
C0
D0
E0
FIRST PAIR AFTER Ex
FIRST PAIR AFTER IMAGE PROCESS
A1
B1
XXX (UNDEFINED VALUE)
SECOND PAIR AFTER Ex
SECOND PAIR AFTER IMAGE PROCESS
C1
THIRD PAIR AFTER Ex
THIRD PAIR AFTER IMAGE PROCESS
D1
E1
FIRST BAND
FIRST PAIR AFTER Ex
FIRST PAIR AFTER IMAGE PROCESS
A2
B2
SECOND BAND (HALFWAY)

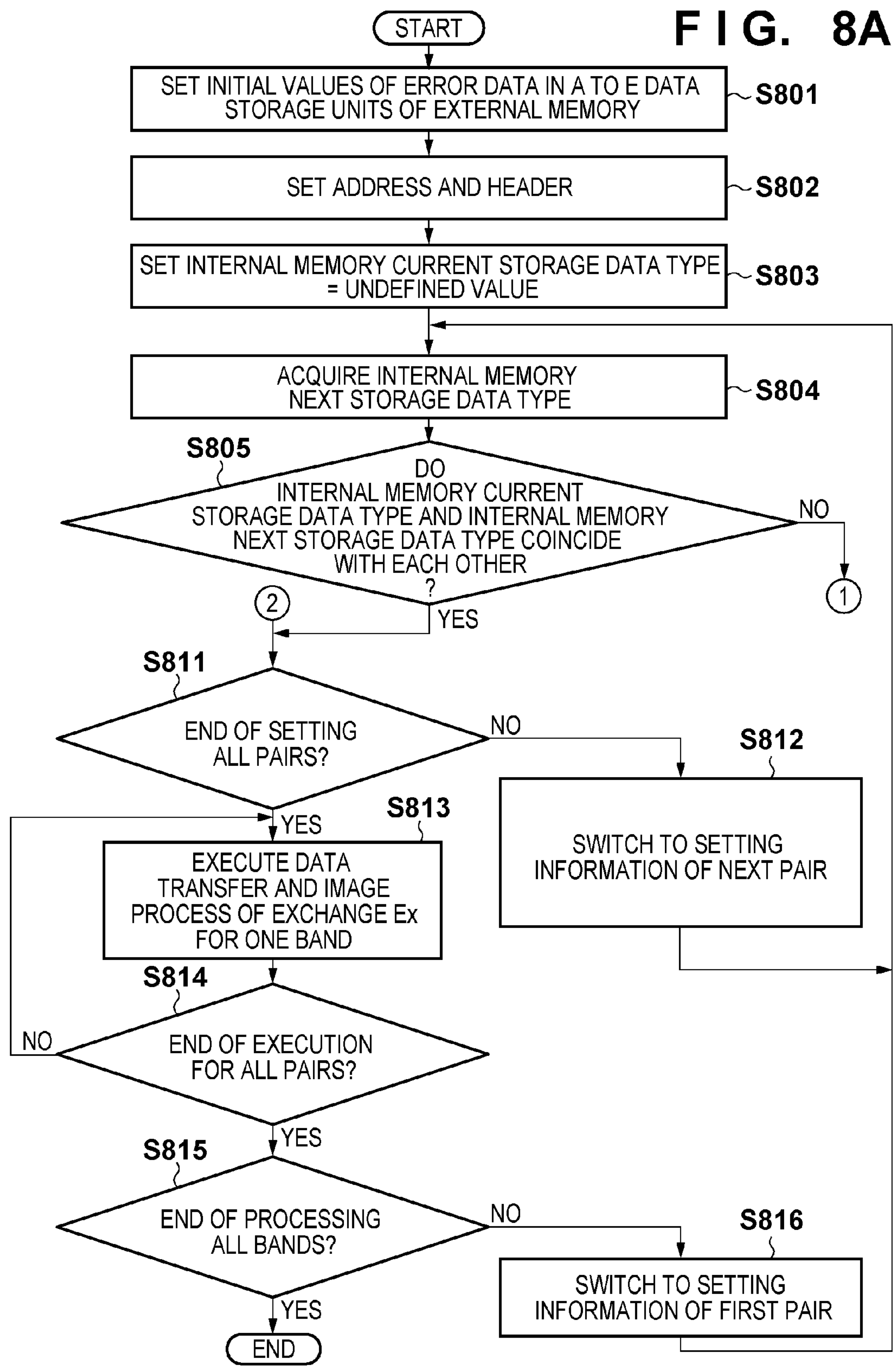

FIG. 8A
START
SET INITIAL VALUES OF ERROR DATA IN A TO E DATA STORAGE UNITS OF EXTERNAL MEMORY
S801
SET ADDRESS AND HEADER
S802
SET INTERNAL MEMORY CURRENT STORAGE DATA TYPE = UNDEFINED VALUE
S803
ACQUIRE INTERNAL MEMORY NEXT STORAGE DATA TYPE
S804
S805
DO INTERNAL MEMORY CURRENT STORAGE DATA TYPE AND INTERNAL MEMORY NEXT STORAGE DATA TYPE COINCIDE WITH EACH OTHER ?
NO
1
2
YES
S811
END OF SETTING ALL PAIRS?
NO
S812
SWITCH TO SETTING INFORMATION OF NEXT PAIR
YES
S813
EXECUTE DATA TRANSFER AND IMAGE PROCESS OF EXCHANGE Ex FOR ONE BAND
S814
END OF EXECUTION FOR ALL PAIRS?
NO
YES
S815
END OF PROCESSING ALL BANDS?
NO
S816
SWITCH TO SETTING INFORMATION OF FIRST PAIR
YES
END

F I G. 8B
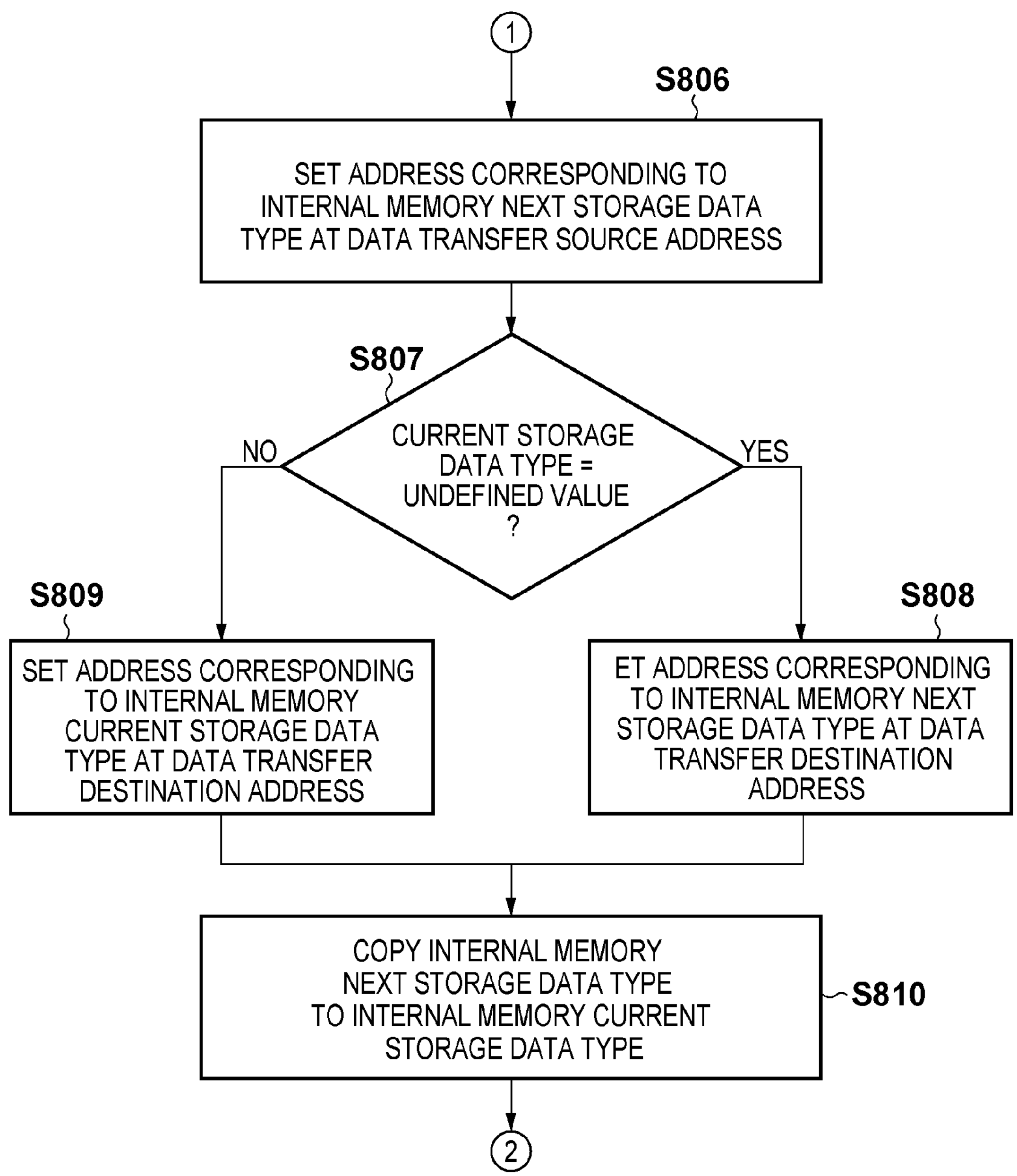

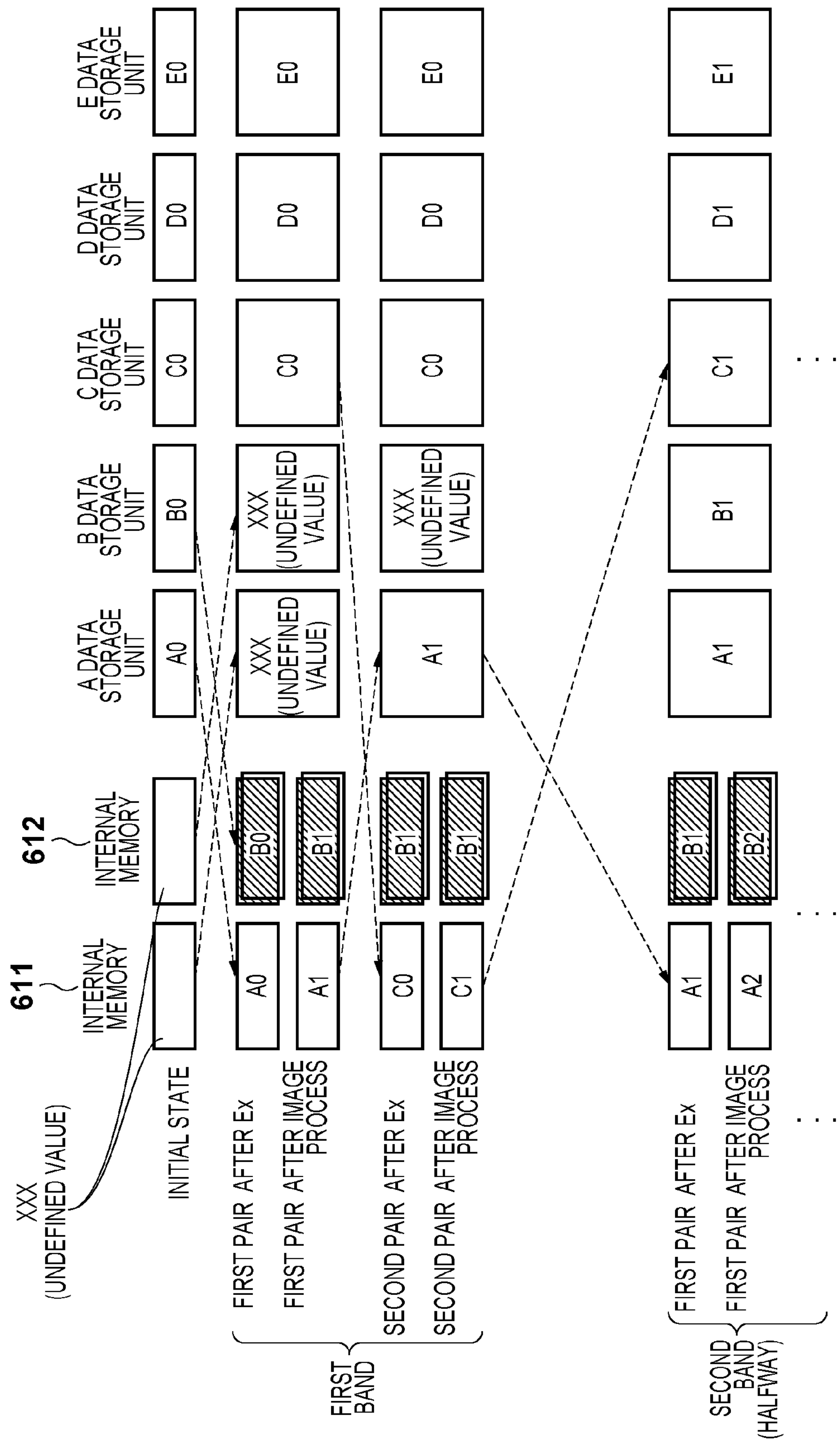
FIG. 9
XXX (UNDEFINED VALUE)
611
INTERNAL MEMORY
612
INTERNAL MEMORY
A DATA STORAGE UNIT
B DATA STORAGE UNIT
C DATA STORAGE UNIT
D DATA STORAGE UNIT
E DATA STORAGE UNIT
INITIAL STATE
A0
B0
C0
D0
E0
FIRST PAIR AFTER Ex
A0
B0
XXX (UNDEFINED VALUE)
XXX (UNDEFINED VALUE)
C0
D0
E0
FIRST PAIR AFTER IMAGE PROCESS
A1
B1
SECOND PAIR AFTER Ex
C0
B1
A1
XXX (UNDEFINED VALUE)
C0
D0
E0
SECOND PAIR AFTER IMAGE PROCESS
C1
B1
FIRST BAND
FIRST PAIR AFTER Ex
A1
B1
A1
B1
C1
D1
E1
FIRST PAIR AFTER IMAGE PROCESS
A2
B2
SECOND BAND (HALFWAY)

INFORMATION PROCESSING APPARATUS, INFORMATION PROCESSING METHOD, AND STORAGE MEDIUM

BACKGROUND OF THE INVENTION

1. Field of the Invention

The present invention relates to an information processing apparatus, information processing method, and storage medium.

2. Description of the Related Art

A conventional technique arbitrates data to be swapped in data swapping when the internal memory is insufficient.

To ensure inseparable accesses for a plurality of access requests such as read modify write, one method issues a lock signal to a slave apparatus to permit an exclusive access.

To prevent access contention in data transfer between respective memories and a shared memory in a system including a plurality of data flow processors, a memory configuration capable of 2-port independent input and output and a communication packet format have been proposed (see Japanese Patent Publication No. 6-42266).

There is also proposed a method of storing dummy data in a read access request data area and sending it when a shift register transfer path is formed by series-connecting registers corresponding to a plurality of processing elements and data is transferred by the access request packet scheme (see Japanese Patent No. 4359490).

As an error check method, data transferred from a transmitting register to a receiving register is transferred again from the receiving register to the transmitting register. The previously transferred data held in the transmitting register is compared with the currently received data, efficiently checking an error (see Japanese Patent Publication No. 4-39929).

As for error diffusion process in image processing in a digital copying machine or the like, a streak generated at the boundary between divided scanning ranges is canceled by diffusing an error by overlapping of pixels by a larger number of lines than an actual binary output region (see Japanese Patent Laid-Open No. 63-309456).

For example, in the error diffusion process, it is important to retain an error from a surrounding pixel for higher image quality, as described in Japanese Patent Publication No. 4-39929. Save and recovery of error data are performed for a plurality of memory areas to implement the above image process with poor memory resources in a system which holds a plurality of parameter spaces separated or independent for respective colors. However, a conventional memory data swapping method cannot use a read area and write area for different application purposes. In addition, the system efficiency lowers owing to redundant data transfer caused by inputting dummy data in response to a read request, or waste of the memory band by frequent read and write requests.

To solve the above problems, the present invention provides a technique of improving data swapping performance.

SUMMARY OF THE INVENTION

According to one aspect of the present invention, there is provided an information processing apparatus comprising: a reception unit adapted to receive a packet containing first data to be stored in a storage unit, a first address indicating an address of second data held in the storage unit, and a second address indicating an address at which the first data is to be written in the storage unit; an access unit adapted to read out the second data from the storage unit based on the first address, and write the first data in the storage unit based on the second address; and a transmission unit adapted to replace the first data of the packet received by the reception unit with the second data read out by the access unit, and transmit the packet.

Further features of the present invention will be apparent from the following description of exemplary embodiments with reference to the attached drawings.

BRIEF DESCRIPTION OF THE DRAWINGS

FIG. 4 is a flowchart showing a sequence when the image processing unit receives a setting command;

FIG. 5A is a chart showing a sequence by an access unit in write W access;

FIG. 5B is a chart showing a sequence by the access unit in read R access;

FIG. 5C is a chart showing a sequence by the access unit in exchange Ex access;

FIG. 7 is a view showing data transition along with a data swapping process;

FIGS. 8A and 8B are flowcharts showing a command setting sequence by an image processing subsystem (error diffusion process); and FIG. 9 is a view showing another example of data transition along with the data swapping process.

DESCRIPTION OF THE EMBODIMENTS

Figure 1A:
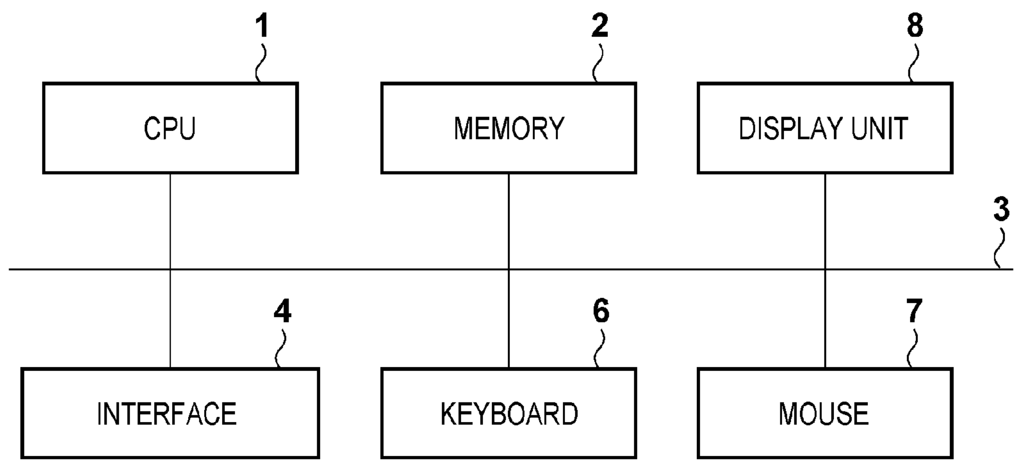
FIG. 1A is a block diagram exemplifying the hardware configuration of an image processing apparatus.

Exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

A basic description of respective building components, relationships with peripheral components, and a data process sequence will be given.

The functional arrangement of an image processing apparatus 10 will be explained with reference to FIG. 1B. The image processing apparatus 10 includes a data input unit 101, image processing unit 102, data output unit 103, external data storage unit 104, and external data storage unit 105. Note that the external data storage units 104 and 105 may have the same arrangement.

The data input unit 101 inputs image data.

The image processing unit 102 executes an image process using, as input information, image data input via the data input unit 101 and a setting command. The data input unit 101 may include an external device interface for accepting an image scanned by a scanner, and an external memory controller for accepting image data transmitted from an external memory. However, the present invention does not limit the image data input/output method, and it suffices to prepare image data in an image process by the image processing unit 102. As for the setting command, the data input unit 101 and data output unit 103 are set to allow input/output between the external data storage units 104 and 105. A control unit 106 sets a data transfer source address and transfer size in the data input unit 101. The data transfer source address (third address) is the address of the external data storage unit 104 from which a setting command to be input to the image processing unit 102 is read out. Similarly, the control unit 106 sets a data transfer destination address and transfer size in the data output unit 103. The data transfer destination address (fourth address) is the address of the external data storage unit 105 in which a setting command output from the image processing unit 102 is written.

The data output unit 103 outputs image data.

The external data storage units 104 and 105 store external data.

The control unit 106 outputs a setting command (command information) to the external data storage unit 104. The control unit 106 instructs the data input unit 101 about a data transfer source address and transfer size. Further, the control unit 106 instructs the data output unit 103 about a data transfer destination address and transfer size. The control unit 106 instructs activation of them. The image processing unit 102 is set in accordance with data which is transmitted from the data input unit 101 and held in the external data storage unit 104, and executes a process within the range of a process activated by the control unit 106.

Note that the transfer source address set in the data input unit 101 and the transfer destination address set in the data output unit 103 can designate the same address. Regarding the external data storage units 104 and 105 as one external memory unit exchanging data between the internal and external memories of the image processing unit 102 by a series of operations.

Figure 2:
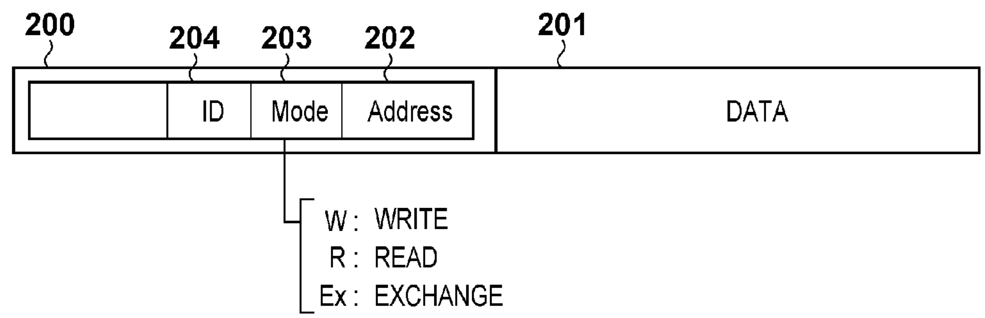
FIG. 2 is a view showing the format of a setting command structure.

An example of the structure of the setting command will be explained with reference to FIG. 2. The setting command includes a header 200 and raw data field 201. The header 200 includes an address field 202, access mode field 203, and ID field 204.

The raw data field 201 does not indicate information used for information transmission or identification at the subsystem level but data used in an image process to be executed by the core of the image processing unit 102. Examples of raw data are an error value in an error diffusion process and a lookup table in a color conversion process.

Data in the external data storage units 104 and 105 need not always have the above-described setting command format, and may be raw data having no header 200. In this case, the setting of the header 200 is added as a setting item of the data input unit 101, the data input unit 101 has a function of adding the header 200, and the data output unit 103 has a function of removing the header 200.

Details of the header 200 will be explained.

The address field 202 designates a register and memory address in the image processing unit 102. The access mode field 203 designates one access mode out of write W, read R, and exchange Ex.

When the access mode field 203 designates write W, the image processing unit 102 executes a process of writing the value of the raw data field 201 at an address designated by the address field 202. When the access mode field 203 designates read R, the image processing unit 102 executes a process of reading out data from an address designated by the address field 202. When the access mode field 203 designates exchange Ex, the image processing unit 102 executes a process of first reading out data from an address designated by the address field 202 and then writing the value of the raw data field 201 at that address.

The ID field 204 may be used to identify each sub-image processing unit when the image processing unit 102 incorporates a plurality of independent sub-image processing units. When the image processing unit 102 is formed from a single processing unit or a plurality of sub-image processing units that can be uniquely identified by addresses, it suffices to determine an access destination based only on the address without using, setting, or referring to the ID. A plurality of sub-image processing units suffice to sequentially load data to be processed and a setting command via a ring bus, crossbar switch, or the like.

Figure 3:
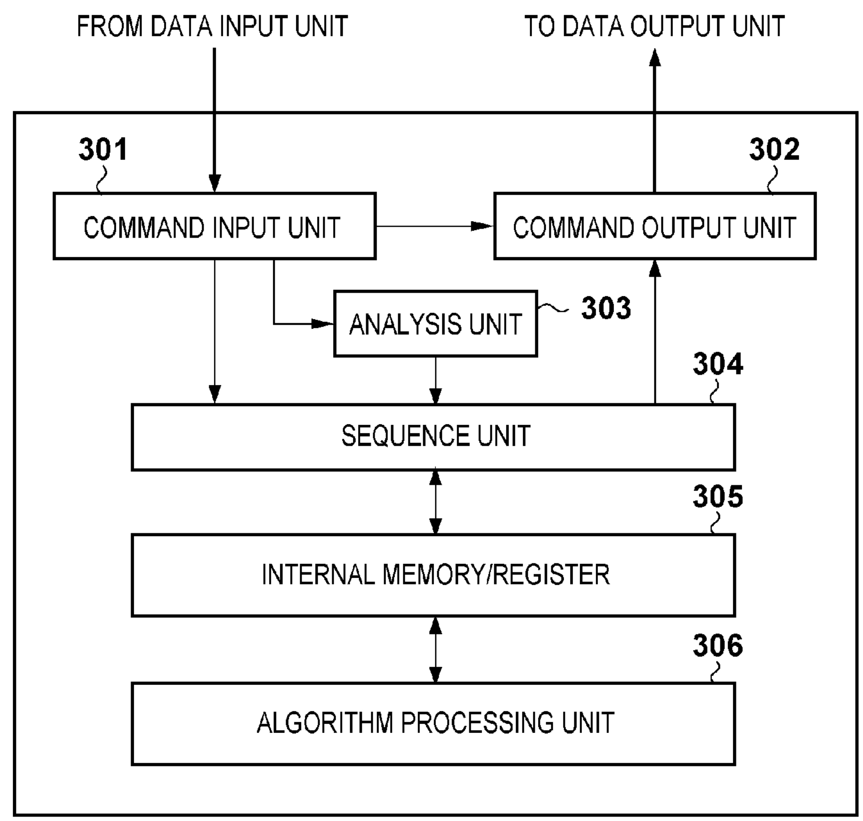
FIG. 3 is a block diagram showing the functional arrangement of an image processing unit.

The internal arrangement of the image processing unit 102 will be described with reference to FIG. 3. The image processing unit 102 includes a command input unit 301, command output unit 302, analysis unit 303, sequence unit 304, internal memory/register 305, and algorithm processing unit 306. When the image processing unit 102 includes a plurality of sub-image processing units, the arrangement shown in FIG. 3 corresponds to one sub-image processing unit, and the command input and output units may be connected to those of another sub-image processing unit.

The command input unit 301 and command output unit 302 function as an interface which connects the inside and outside of the image processing unit 102. The analysis unit 303 analyzes the access mode field 203 of a setting command. The analysis unit 303 notifies the sequence unit 304 of one access mode out of write W, read R, and exchange Ex. The sequence unit 304 executes a process corresponding to the access mode notified from the analysis unit 303 for the internal memory/register 305. The internal memory/register 305 stores various kinds of information transmitted/received as raw data. The algorithm processing unit 306 executes the process of an image processing algorithm for an input image based on various kinds of setting information in the internal memory/register 305. The algorithm processing unit 306 writes a value corresponding to the process result of the image processing algorithm in the internal memory/register 305.

An error diffusion process is an algorithm process in which an error value for a previously processed pixel is referred to when processing a subsequent pixel. In this process, it is a common practice to process an error value loaded from the internal memory/register before the process and then write back the updated error value. The written-back error value is referred to when processing a pixel positioned next in the same image plane.

During the implementation of an image processing apparatus, it is sometimes difficult to mount a process of a predetermined scale or more under restrictions on the cost and packaging technique. Especially when the present invention is practiced by hardware, it may be hard to provide enough hardware resources for the number of originally processed image planes under restrictions on the circuit scale and the like.

For example, a case in which image data of five colors A, B, C, D, and E (five-dimensional color space) are processed sequentially for each band (partial image) will be considered. When the hardware resource (algorithm processing unit 306 to be described later) can process only band image data of two colors at once, the process is repeated three times to process image data of the five colors. More specifically, the process for band image data of two colors or less is executed sequentially to, for example, process A and B⇒C and D⇒E. In a process such as error diffusion, a band (partial image) at the position of interest undergoes the error diffusion process for the five colors A to E, and then the position of interest shifts to the next band. This is because the error diffusion process may be accompanied by a process in which the values of the five colors need to be synchronized (in real time) for pixels at the same position, like a color conversion process or printing process. The error value changes depending on the image contents of A, B, C, D, and E. Thus, every time each band image data is to be processed, error data held in the internal memory/register 305 need to be switched in the order of (A, B)⇒(C, D)⇒(E). This is because the error diffusion process needs to process the same image content (same color in this case) using the error value of a previously processed band. However, if the internal memory/register 305 can hold error values of only two colors, a process for the next two colors (C, D) cannot be executed with the error values of (A, B) kept held.

In this case, the control unit 106 executes a process for A and B and temporarily saves, in the external data storage units 104 and 105, updated error data of A and B held in the internal memory/register 305. Then, the control unit 106 loads error data held in advance for a process of the next colors (C, D). In this case, the conventional technique first reads out the contents of the internal memory/register 305 to the external data storage unit 105 in accordance with a read R command, then switches the address of the external data storage unit 105, and in accordance with a write W command, loads the error value of the color C saved in advance in the external data storage unit 105.

According to the present invention, internally held A and B error values can be easily saved simultaneously when C and D error values are loaded to the image processing unit 102. Exchange of internal data can be executed quickly when switching a plane to be processed.

A process sequence by the respective processing units forming the image processing unit 102 will be explained with reference to FIG. 4.

In step S401, the command input unit 301 receives a setting command. The setting command is command information including instruction information, address information (first and second addresses), and the first data. The instruction information indicates one of a write instruction to instruct write of the first data in the internal memory/register 305, a read instruction to instruct read of the second data from the internal memory/register 305, and an exchange instruction to instruct read of the second data from the internal memory/register 305 and then write the first data in the internal memory/register 305. The address information designates a storage area in the internal memory/register 305.

In step S402, the command input unit 301 checks the ID field 204 of the setting command received in step S401, and discriminates whether the setting command is directed to the command input unit 301. If the command input unit 301 discriminates that the setting command is directed to it (YES in step S402), the process advances to step S403. If the command input unit 301 discriminates that the setting command is not directed to it (NO in step S402), the process advances to step S404.

In step S403, the analysis unit 303 analyzes the access mode. The process then advances to step S405. One of the first to third processes to be described later is executed in accordance with the access mode analyzes result.

In step S404, the command output unit 302 directly outputs the received setting command to the outside. The process then ends.

In step S405, the analysis unit 303 determines whether the access mode is exchange Ex. If the analysis unit 303 determines that the access mode is exchange Ex (YES in step S405), the process advances to step S406. If the analysis unit 303 determines that the access mode is not exchange Ex (NO in step S405), the process advances to step S407.

In step S406, the sequence unit 304 makes a read access to the internal memory/register 305. Then, the sequence unit 304 transmits the acquired data (raw data) to the command output unit 302. More specifically, when it is analyzed that the instruction information contained in the command information is an exchange instruction, the sequence unit 304 reads out the second data from the internal memory/register 305 and transfers it to the output unit (second process). Thereafter, the process advances to step S410.

In step S407, the analysis unit 303 determines whether the access mode is read R. If the analysis unit 303 determines that the access mode is read R (YES in step S407), the process advances to step S408. If the analysis unit 303 determines that the access mode is not read R (NO in step S407), the process advances to step S409.

In step S408, the sequence unit 304 makes a read access to the internal memory/register 305. Then, the sequence unit 304 transmits the acquired data (raw data) to the command output unit 302 (third process). After that, the process advances to step S411.

In step S409, the sequence unit 304 makes a write access to the internal memory/register 305 and writes the raw data field 201 of the setting command. The process then advances to step S412. More specifically, when it is analyzed that the instruction information contained in the command information is a write instruction, the sequence unit 304 writes the first data in the internal memory/register 305 (first process).

In step S410, the sequence unit 304 makes a write access to the internal memory/register 305 and writes the raw data field 201 of the setting command. More specifically, the sequence unit 304 writes the first data in the internal memory/register 305 (second process). The process then advances to step S411.

In step S411, the command output unit 302 outputs, to the outside, the command containing the raw data field 201 of the setting command that has been received from the sequence unit 304 (read out from the internal memory/register 305). The process then ends.

In step S412, the command output unit 302 outputs, to the outside, the command containing the raw data field 201 of the setting command that remains unchanged from the received one (that is, identical to the one written in the internal memory/register 305). After that, the process ends.

In this way, the first data contained in the command information is directly transmitted after the first process. After the second or third process, the first data contained in the command information is replaced with the second data read out from the internal memory/register 305 and then the command information is transmitted.

The above description is premised on that the command access modes are only three modes "write W", "read R", and "exchange Ex", so the process does not branch to confirm the write W mode. If the access mode is neither read R nor exchange Ex, the process advances to step S409. In this case, it can be determined that the access mode is remaining write W, and whether the access mode is the write W mode need not be confirmed. However, a process of determining whether the access mode is the write W mode may be further added, as a matter of course. In this case, whether the access mode is the write W mode is determined after the process of step S407. If it is determined that the access mode is the write W mode, the process advances to step S409; if NO, no process is executed. Note that the access mode need not always be determined in the order of exchange Ex, read R, and write W, and this order can be arbitrarily changed.

Clock sequences between the sequence unit 304 and the internal memory/register 305 in the respective access modes will be explained with reference to FIGS. 5A to 5C. FIGS. 5A to 5C show an outline of the difference between the access modes. Hence, an illustration of accessory signals such as a chip select signal (CE) and write enable signal (WE) will be omitted, except for a clock 500.

FIG. 5A shows a clock sequence in the write W access mode. In this case, the sequence unit 304 can notify the internal memory/register 305 of a write destination address 501 (second address) and data 502 at the same timing.

FIG. 5B shows a clock sequence in the read R access mode. In this case, the sequence unit 304 notifies the internal memory/register 305 of a read source address 503 (first address), and the internal memory/register 305 transfers data 504 to the sequence unit 304 at the next clock.

FIG. 5C shows a clock sequence in the exchange Ex access mode. At this time, read R and write W are combined. More specifically, the sequence unit 304 notifies the internal memory/register 305 of a read source address 505 at the first clock. The internal memory/register 305 transfers data 506 to the sequence unit 304 at the next clock. At the final clock, the sequence unit 304 can notify the internal memory/register 305 of a write destination address 507 and data 508 at the same timing.

That is, exchange Ex can be performed to achieve, by one instruction, an operation of moving data from the external data storage unit 104 to the image processing unit 102 and viceversa, moving data from the image processing unit 102 to the external data storage unit 105. This can halve the setting command expansion size and access count to the external data storage units 104 and 105, compared to executing write W and read R. The memory size and access contention can be reduced.

As described above, processing five colors by the image processing unit 102 capable of processing only two colors requires a process of saving updated data held in the internal memory/register 305.

In this case, to execute simple control without using the image processing apparatus according to the present invention, a process of reading out updated data while loading necessary data needs to be performed in every process of two colors. However, when only two colors can be processed simultaneously, processing colors by a number other than multiples of two leads to wasteful exchange, which will be described below.

For example, when processing colors in a pattern of two colors—two colors—one color, like (A, B), (C, D), and E, it suffices to exchange only one color to process the final E. However, such simple control requires saving C and D and loading D when processing E, so E and dummy data X need to be loaded at the same time as saving of C and D. Hence, loading dummy data XX is wasteful.

A control method of efficiently transferring data even in this case will be explained. An application of the error diffusion process to the five colors A, B, C, D, and E will be explained. The error diffusion process calculates a binary value while diffusing error data generated at each pixel to surrounding pixels when binarizing a multi-valued image. A pixel which has received error data from the surroundings undergoes binarization based on the error data. Newly generated error data is diffused to surrounding pixels in the same way.

Figure 6:
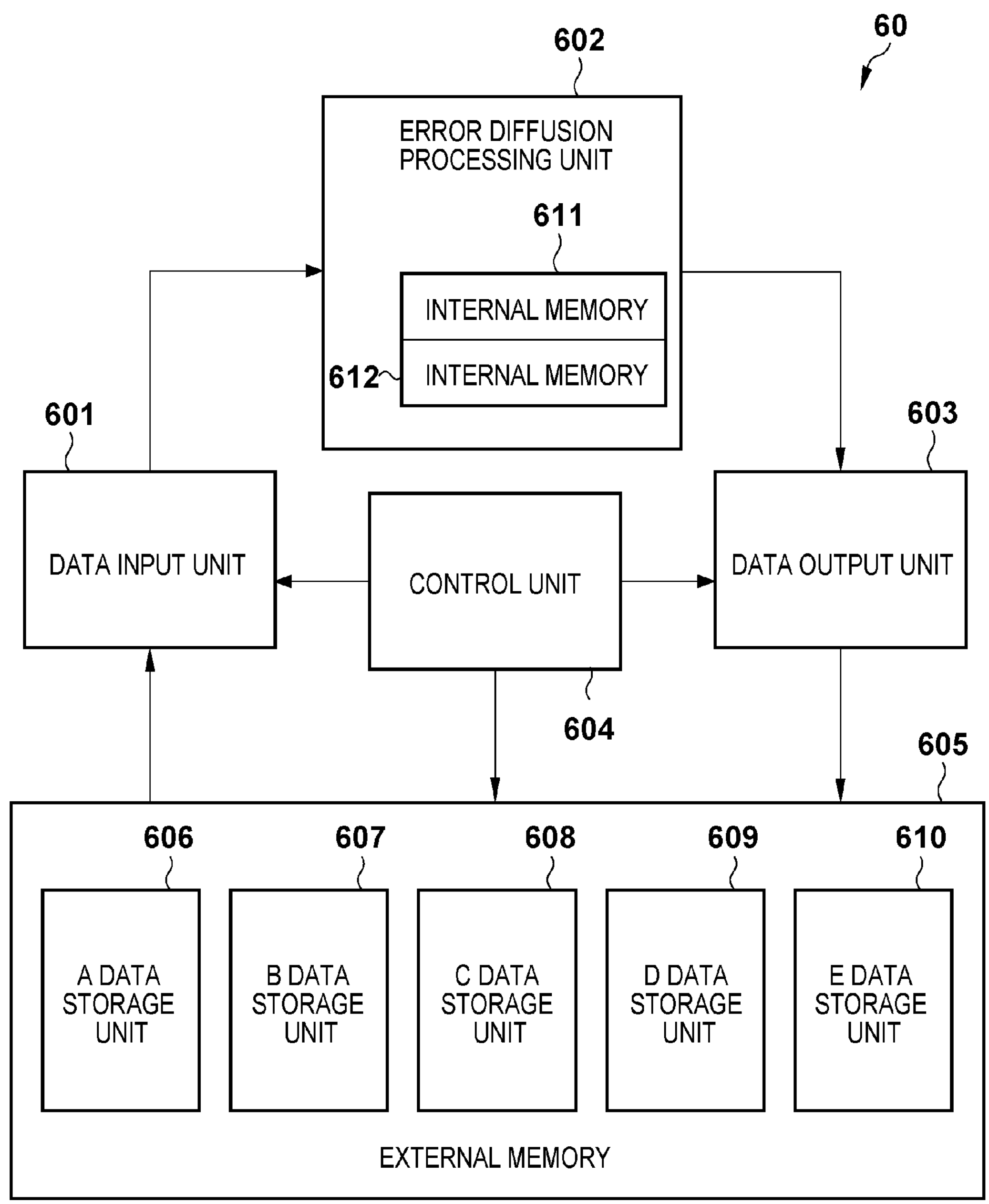
FIG. 6 is a block diagram showing the functional arrangement of an image processing apparatus.

The functional arrangement of an image processing apparatus 60 shown in FIG. 6 will be described. The image processing apparatus 60 includes a data input unit 601, error diffusion processing unit 602, data output unit 603, external memory 605, and control unit 604. The external memory 605 includes, as areas for respective colors, an A data storage unit 606, B data storage unit 607, C data storage unit 608, D data storage unit 609, and E data storage unit 610. The data input unit 601, data output unit 603, and control unit 604 correspond to the data input unit 101, data output unit 103, and control unit 106 in FIG. 1B, respectively, so a detailed description thereof will not be repeated.

Figure 1B:
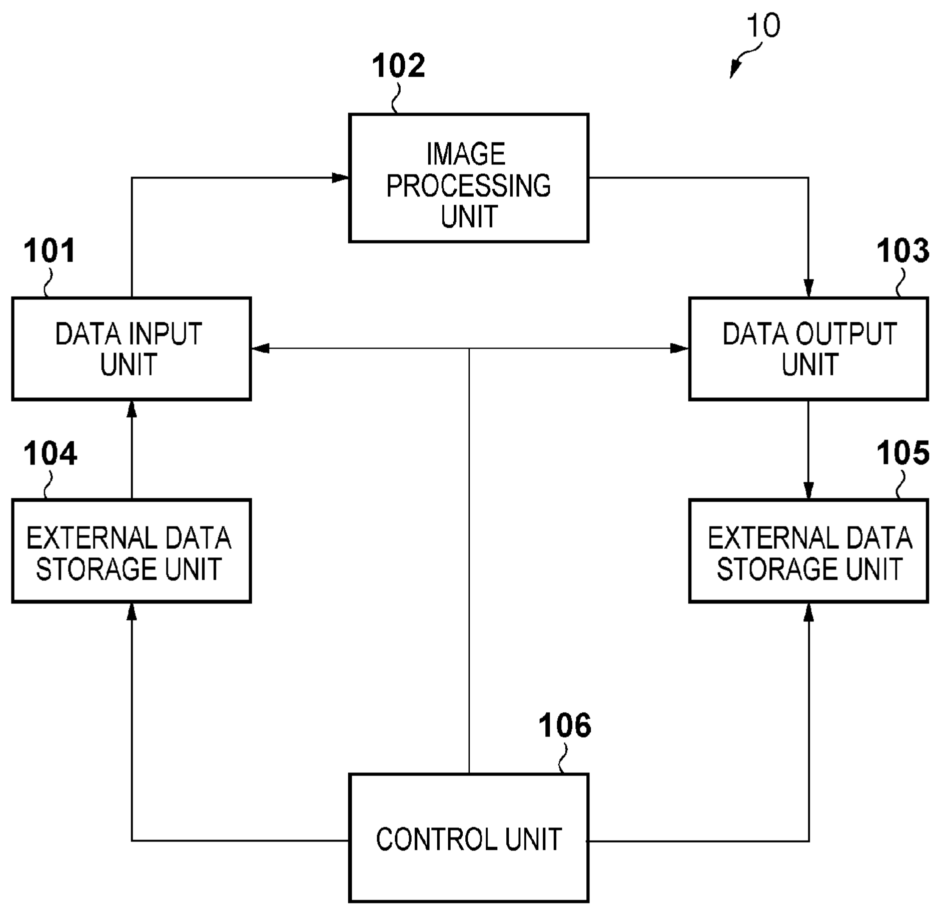
FIG. 1B is a block diagram showing the functional arrangement of the image processing apparatus.

The error diffusion processing unit 602 is one form of the image processing unit 102 in FIG. 1B, and holds error data in its internal memory. The error data is one form of raw data. Error data are independent of each other for the respective colors A, B, C, D, and E. The five colors are assumed here, but k colors (k is a natural number) can be used.

The following description is premised on the fact that the internal memory can store error data of a maximum of two colors. To cope with two colors, the internal memory is logically handled as two divided memories, that is, an internal memory 611 (first internal memory) and internal memory 612 (second internal memory). Note that the first to nth internal memories may be able to store error data of a maximum of n colors.

The basic settings of the data input unit 601 and data output unit 603 are the same as those of the data input unit 101 and data output unit 103 in FIG. 1B, as described above. Since error data of a maximum of two colors can be stored, the data transfer source address and data transfer destination address need to hold settings for each storable color, and two pairs for each of them are set. The header 200 described with reference to FIG. 2 is set in the data input unit 601. Only error data corresponding to the respective colors are arranged in the A data storage unit 606 to E data storage unit 610 of the external memory 605. For k colors (k is a natural number), the external memory 605 functions as the first to kth external memories.

As described above, when the internal memory cannot hold error values corresponding to all of the colors to be processed, error data in the internal memory 611 or 612 needs to be saved in the external memory 605. At the same time, error data saved in the external memory 605 in a previous band process needs to be written back in the internal memory 611 or 612.

Detailed control procedures and a process sequence in the arrangement shown in FIG. 6 will be described. FIG. 7 shows transition of data held in the internal memories 611 and 612 and the external memory at timings to process each band.

The control unit 604 holds an internal memory current storage data type (current storage information) to discriminate which of the external memories 606 to 610 corresponding to A to E stored data currently stored in the internal memory 611 or 612. Also, the control unit 604 holds an internal memory next storage data type (next storage information) to discriminate which of the external memories 606 to 610 corresponding to A to E stores data to be stored next in the internal memory 611 or 612.

As initial setting, the control unit 604 sets the initial values of A to E error data in the A data storage unit 606 to E data storage unit 610.

Then, the control unit 604 sets A and B as process colors of the first pair. By referring to the next storage data type (next storage information) from the aforementioned register, the control unit 604 sets the A data storage unit 606 at the first data transfer source address of the data input unit 601 and the B data storage unit 607 at the second data transfer source address.

Also, the control unit 604 sets the A data storage unit 606 at the first data transfer destination address of the data output unit 603 and the B data storage unit 607 at the second data transfer destination address.

The control unit 604 sets a write address in the address field 202 of the header 200 of the setting command, and sets exchange Ex in the access mode field 203.

The control unit 604 updates the internal memory current storage data type by copying the internal memory next storage data type. In this fashion, information about the setting of a color of error data to be transferred to the internal memory is held and used to set a data transfer destination address when setting the next pair.

Subsequently, the second pair is set. The setting of the second pair is transferred to the error diffusion processing unit 602 after the setting of the first pair is actually transferred to the error diffusion processing unit 602 and the error diffusion process is done. Transition of the memory contents when the setting of the first pair is transferred to the error diffusion processing unit 602 before the setting of the second pair will be explained.

When the error data transfer process is activated, error data stored in the A data storage unit 606 is written in the internal memory 611. In turn, error data stored in the internal memory 611 is written in the A data storage unit 606. Similarly, error data stored in the B data storage unit 607 is written in the internal memory 612. In exchange, error data stored in the internal memory 612 is written in the A data storage unit 606.

However, data in the A data storage unit 606 at this time is originally the initial value of the internal memory 611 and is not particularly useful. Designating the A data storage unit 606 as the data transfer destination address unit merely using the A data storage unit 606 as a work area. At this time, the initial value has to be set in the internal memory 611, but no content of the internal memory 611 need be read out. Thus, write W can also be set in the access mode field 203.

However, when setting the next and subsequent pairs, the contents of the internal memory 611 need to be read out. Since in the access mode field 203 changes to exchange Ex, exchange Ex is set in the access mode field 203 in advance for the current pair. The band process can proceed without changing the header 200 of the setting command, and the control can be simplified. From this, command information used to transfer error data has a value indicating exchange Ex in the access mode field 203.

A detailed description of the internal memory 612 and B data storage unit 607 to which the above process is applied in the same manner will be omitted.

After the end of transferring error data, the error diffusion processing unit 602 performs the error diffusion process, updating the internal memories 611 and 612 to the latest A error data and B error data, respectively. After the updating, the setting contents of the second pair are actually transferred to the error diffusion processing unit 602.

Referring back to the setting of the second pair, the control unit 604 sets C as a process color of the second pair. The control unit sets the C data storage unit 608 at the first data transfer source address of the data input unit 601. Since the image processing apparatus 60 can process two colors, the two colors A and B are generally replaced. However, only one color C is to be processed, so, for example, only A error data is exchanged without setting the second data transfer source address. This can reduce the communication load generated by unnecessary data transfer.

By referring to the internal memory current storage data type, the control unit 604 sets an address indicating the A data storage unit 606 as the first data transfer destination address of the data output unit 603. The control unit 604 does not set the second data transfer destination address. Further, the control unit 604 updates the internal memory current storage data type by copying the internal memory next storage data type.

When the error data transfer process is activated, the data input unit 601 writes the contents of the C data storage unit 608 in the internal memory 611. In turn, the data output unit 603 writes the contents of the internal memory 611 in the A data storage unit 606. The latest A error data in the internal memory 611 can be saved in the A data storage unit 606. However, the latest B error data remains in the internal memory 612. For the second pair, only one color C is processed, and it is desirable to inhibit a process for the second color B. This can prevent an unwanted change of the updated B error data by the process of only C. This can also prevent transfer of B error data which need not be exchanged at this time, suppressing the transfer data amount.

Upon the transfer, transfer and setting of C error data are completed, and the error diffusion processing unit 602 performs the error diffusion process. The internal memory 611 is updated to the latest C error data. After that, the setting contents of the third pair are actually transferred to the error diffusion processing unit 602.

The process proceeds to the setting of the third pair. The control unit 604 sets D and E as process colors of the third pair. In a transfer source setting process, the control unit 604 sets the D data storage unit 609 at the first data transfer source address of the data input unit 601 and the E data storage unit 610 at the second data transfer source address. In a transfer destination setting process, the control unit 604 refers to the internal memory current storage data type, and sets the C data storage unit 608 at the first data transfer destination address of the data output unit 603 and the B data storage unit 607 at the second data transfer destination address. Particularly, the internal memory 612 has not been set for the previous pair and keeps holding the second previous setting information. The control unit 604 updates the internal memory current storage data type by copying the internal memory next storage data type.

When the error data transfer process is activated, the data input unit 601 writes the contents of the D data storage unit 609 in the internal memory 611. Instead, the data output unit 603 writes the contents of the internal memory 611 in the C data storage unit 608.

Also, the data input unit 601 writes the contents of the E data storage unit 610 in the internal memory 612. In turn, the data output unit 603 writes the contents of the internal memory 612 in the C data storage unit 608. Accordingly, the latest C error data stored in the internal memory 611 can be saved in the C data storage unit 608. Similarly, the latest B error data stored in the internal memory 612 can be saved in the B data storage unit 607. As a result, all the data are replaced.

After the error data transfer, the error diffusion processing unit 602 performs the error diffusion process. The error data held in the internal memory 611 is updated to the latest D error data based on the process result of the error diffusion processing unit 602.

As a consequence, the process for the three pairs of the first band ends. The next and subsequent bands are also processed by repeating the above process for three pairs.

This control sequence will be explained with reference to FIGS. 8A and 8B.

In step S801, the control unit 604 sets the initial values of error data in the A to E data storage units of the external memory 605.

In step S802, the control unit 604 sets the address and the header 200.

In step S803, the control unit 604 sets the internal memory current storage data type to an undefined value (initialization).

In step S804, the control unit 604 acquires an internal memory next storage data type.

In step S805, the control unit 604 compares the internal memory current storage data type with the internal memory next storage data type, and determines whether they coincide with each other. If the control unit 604 determines that these types coincide with each other (YES in step S805), the process advances to step S811. If the control unit 604 determines that these types do not coincide with each other (NO in step S805), the process advances to step S806.

In step S806, the control unit 604 sets, at the data transfer source address, the address of one of the A to E data storage units of the external memory 605 that corresponds to the internal memory next storage data type.

In step S807, the control unit 604 determines whether the internal memory current storage data type is an undefined value (initial value). If the control unit 604 determines that the internal memory current storage data type is an undefined value (initial value) (YES in step S807), the process advances to step S808. If the control unit 604 determines that the internal memory current storage data type is not an undefined value (initial value) (NO in step S807), the process advances to step S809.

In step S808, the control unit 604 sets, at the data transfer destination address, the address of one of the A to E data storage units of the external memory 605 that corresponds to the internal memory next storage data type. The process then advances to step S810.

In step S809, the control unit 604 sets, at the data transfer destination address, the address of one of the A to E data storage units of the external memory 605 that corresponds to the internal memory current storage data type. The process then advances to step S810.

In step S810, the control unit 604 copies the internal memory next storage data type to the internal memory current storage data type. Thereafter, the process advances to step S811.

In step S811, the control unit 604 determines whether all pairs have been set. If the control unit 604 determines that not all pairs have been set (NO in step S811), the process advances to step S812. If the control unit 604 determines that all pairs have been set (YES in step S811), the process advances to step S813.

In step S812, the control unit 604 switches the setting information to the next one. The process then returns to step S804.

In step S813, the control unit 604 controls the error diffusion processing unit 602 to execute data transfer and an image process in exchange Ex for one band.

In step S814, the control unit 604 determines whether the data transfer and image process have been executed for all pairs. If the control unit 604 determines that the data transfer and image process have not been executed for all pairs (NO in step S814), the process advances to step S813. If the control unit 604 determines that the data transfer and image process have been executed for all pairs (YES in step S814), the process advances to step S815.

In step S815, the control unit 604 determines whether all bands have been processed. If the control unit 604 determines that not all bands have been processed (NO in step S815), the process advances to step S816. If the control unit 604 determines that all bands have been processed (YES in step S815), the process ends.

In step S816, the control unit 604 switches the setting information to that of the first pair. The process then returns to step S804.

In this manner, when exchanging error data based on exchange Ex, the type of internally held data and that of data to be loaded are managed, efficiently controlling data exchange.

Especially, if the type of internally held data and that of data to be loaded coincide with each other in step S805, no exchange Ex instruction is issued. Unwanted data transfer in an exchange process can be avoided, improving performance.

An example of efficiency improvement will be explained with reference to FIG. 9. According to the control procedures described with reference to FIGS. 8A-8B, exchange when grouping the three colors A, B, and C into a pair of A and B and only C is performed as shown in FIG. 9. First, A and B are loaded as initial values. Then, for example, only A and C are exchanged to continue the process without exchanging B. This determination is made in steps S805 and S811 of FIG. 8A. More specifically, both A and B are loaded for the first pair of the first band because they differ from initial values. Undefined values originally held in the internal memories 611 and 612 are saved in the A data storage unit 606 and B data storage unit 607, respectively.

For the second pair of the first band, only C is targeted, so no process is done for the internal memory 612 in step S811. The B error value remains held in the internal memory and is not transferred.

In the first pair of the second band, the internal current storage data type and external next storage data type coincide with each other for B (both of them indicate B) in step S805. Thus, no exchange instruction is issued.

When repetitively processing A and B, and C, B error data, which essentially need not be exchanged, effectively remains held in the process procedures without wastefully transferring it.

In the above description, an image in the five-dimensional color space is handled, and five areas are assigned to the external memory (k=5 in the first to kth external memories). However, the number of dimensions of the color space is arbitrary, and it suffices to assign areas corresponding to the number of dimensions to the memory. External memories may be assigned by a number corresponding to the number of dimensions of the color space. The internal memory/register suffices to assign areas by a number corresponding to the number of dimensions of the color space that can be processed at once by the algorithm processing unit for one band.

It suffices to save the internal memory current storage data type (current storage information) and the internal memory next storage data type (next storage information) in a register (not shown) which can be referred to by the control unit 106. These pieces of information can be used to determine a color in process and one to be processed next. This may be implemented by a counter which simply counts up a value corresponding to a state indicating the pair of a color to be processed next. In this case, the control unit 106 interprets a table used to convert a counter value into an address in the external memory, and sets addresses in the data input unit 601 and data output unit 603.

In the above description, image data is divided into band-like areas called bands. However, the present invention is similarly applied to a case in which one line or a tile (m×n pixels) is handled as a partial image.

The present invention can be practiced even in a system in which the image processing unit 102 is applied to a general computer. An example of the hardware configuration of an image processing apparatus serving as an information processing apparatus according to the present invention will be explained with reference to FIG. 1A. A CPU 1 controls the operation of the whole apparatus and that of the image processing unit 102. A memory 2 stores data, image data to be processed by the image processing unit 102, and values such as an error value for use in a process. The memory 2 includes a RAM serving as even a work area for the CPU 1, and a ROM which stores programs to be executed by the image processing unit 102 and CPU 1. A bus 3 manages data transfer between processing units. An interface 4 interfaces the bus 3 and various apparatuses. An external storage device 5 stores programs and data to be loaded into the CPU 1. A keyboard 6 and mouse 7 configure an input device for activating a program and designating a program operation. A display unit 8 displays the operation result of a process. By applying the above-described process to this configuration, data for use in an image process can be efficiently swapped between the RAM of the memory 2 and the image processing unit 102, like the above embodiment.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-183386 filed on Aug. 18, 2010, which is hereby incorporated by reference herein in its entirety.

What is claimed is:

1. An information processing apparatus comprising:

a reception unit that receives a packet containing first data to be stored in a storage unit and address information representing an address of second data held in the storage unit and an address of first data to be written in the storage unit;

an access unit that reads out the second data held in the storage unit based on the address information, and writes the first data in the storage unit based on the address information; and a transmission unit that replaces the first data of the packet received by said reception unit with the second data read out by said access unit, and transmits the packet, wherein said access unit writes the first data in the storage unit after reading out the second data held in the storage unit, using the address information in the packet received by said reception unit.

2. The apparatus according to claim 1, wherein the storage unit is an internal memory, and the information processing apparatus further comprises an input unit that reads out the first data held in an external memory and an output unit that writes the second data read out by said access unit in the external memory.

3. The apparatus according to claim 2, wherein said reception unit receives image data, said apparatus further comprising a processing unit that processes said image data received by said reception unit based on the second data held in the storage unit.

4. The apparatus according to claim 3, wherein the second data is an error value, and said processing unit performs an error diffusion process based on the error value.

5. The apparatus according to claim 4, wherein said processing unit performs said error diffusion process for each dimension of a color space for a partial image of the image data, said output unit writes, in the external memory, said error value held in the storage unit, and the information processing apparatus further comprises a control unit that outputs a packet to write, in the internal memory, an error value corresponding to a dimension to be processed by said processing unit.

6. The apparatus according to claim 5, further comprising an input unit that stores, in the packet output by said control unit, the first data stored at a first address of the external memory that is designated by said control unit, and input the packet to said processing unit, wherein the second data stored in the packet output from said processing unit is written at a second address of the external memory that is designated by said control unit.

7. The apparatus according to claim 6, wherein said control unit sets the first address and the second address to different addresses.

8. An information processing apparatus comprising:

a reception unit that receives a packet containing instruction information indicating one of a write instruction to instruct write of first data in a storage unit, a read instruction to instruct read of second data from the storage unit, and an exchange instruction to instruct read of the second data from the storage unit and then write of the first data in the storage unit, address information designating a storage area in the storage unit, and the first data;

a transmission unit adapted to transmit the packet;

an analysis unit that analyzes the packet received by said reception unit;

a sequence unit adapted to, (i) when said analysis unit analyzes the instruction information contained in the packet to be the write instruction, write the first data in the storage unit, (ii) when said analysis unit analyzes the instruction information contained in the packet to be the exchange instruction, read out the second data from the storage unit, transfer the second data to said transmission unit, and write the first data in the storage unit, and (iii) when said analysis unit analyzes the instruction information contained in the packet to be the read instruction, read out the second data from the storage unit and transfer the second data to said transmission unit, wherein after processing according to (i), said transmission unit directly transmits the packet, and after processing according to (ii) or (iii), said transmission unit replaces the first data contained in the packet with the second data read out from the storage unit and then transmits the packet, and said sequence unit writes the first data in the storage unit after reading out the second data held in the storage unit, using the address information in the packet received by said reception unit.

9. An information processing method in an information processing apparatus including a storage unit, comprising:

causing a reception unit to receive a packet containing first data to be stored in the storage unit and address information representing an address of second data held in the storage unit and an address of first data to be written in the storage unit;

causing an access unit to read out the second data held in the storage unit based on the address information, and write the first data based on the address information; and causing a transmission unit to replace the first data of the packet received in the causing a reception unit to receive a packet, with the second data read out in the causing an access unit to read out the second data, and to send the packet, wherein said access unit writes the first data in the storage unit after reading out the second data held in the storage unit, using the address information in the pocket received by said reception unit.

10. A non-transitory computer-readable storage medium storing a computer program for causing a computer to execute each step of an information processing method defined in claim 9.

11. An information processing method in an information processing apparatus including a storage unit, comprising:

causing a reception unit to receive a packet containing instruction information indicating one of a write instruction to instruct write of first data in the storage unit, a read instruction to instruct read of second data from the storage unit, and an exchange instruction to instruct read of the second data from the storage unit and then write of the first data in the storage unit, address information designating a storage area in the storage unit, and the first data;

causing a transmission unit to transmit the packet;

causing an analysis unit to analyze the packet received in the causing a reception unit to receive a packet;

causing a sequence unit to, (i) when the instruction information contained in the packet is analyzed in the causing an analysis unit to analyze the packet, to be the write instruction, write the first data in the storage unit, (ii) when the instruction information contained in the packet is analyzed in the causing an analysis unit to analyze the packet, to be the exchange instruction, read out the second data from the storage unit, transfer the second data to the transmission unit, and write the first data in the storage unit, and (iii) when the instruction information contained in the packet is analyzed in the causing an analysis unit to analyze the packet, to be the read instruction, read out the second data from the storage unit and transfer the second data to the transmission unit, wherein in the causing a transmission unit to transmit the packet, after processing according to (i) to write the first data, the packet is directly transmitted, and after processing according to (ii) and (iii) to read out the second data, the first data contained in the packet is replaced with the second data read out from the storage unit and then the packet is transmitted, and said sequence unit writes the first data in the storage unit after reading out the second data held in the storage unit, using the address information in the packet received by said reception unit.

12. A non-transitory computer-readable storage medium storing a computer program for causing a computer to execute each step of an information processing method defined in claim 11.

* * * * *